(12) United States Patent
Ogura

(10) Patent No.: US 6,817,584 B2
(45) Date of Patent: Nov. 16, 2004

(54) CUP HOLDER

(75) Inventor: Mitsuo Ogura, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/228,942

(22) Filed: Aug. 28, 2002

(65) Prior Publication Data

US 2003/0042383 A1 Mar. 6, 2003

(30) Foreign Application Priority Data

Aug. 29, 2001 (JP) .................................... P2001-258991

(51) Int. Cl.$^7$ .............................................. A47K 1/08
(52) U.S. Cl. .................................. 248/311.2; 224/926
(58) Field of Search ............................. 248/311.2, 685; 297/188.15, 188.16, 188.17; 312/319.1, 330.1, 334.46; 224/926

(56) References Cited

U.S. PATENT DOCUMENTS

| | | | | |
|---|---|---|---|---|
| 4,738,423 A | * | 4/1988 | DiFilippo et al. | 248/311.2 |
| 4,765,581 A | * | 8/1988 | Wallace et al. | 248/311.2 |
| 5,071,096 A | * | 12/1991 | Hartmann et al. | 248/154 |
| 5,232,262 A | * | 8/1993 | Tseng | 297/188.17 |
| 5,673,891 A | * | 10/1997 | Fujihara et al. | 248/311.2 |
| 6,019,334 A | * | 2/2000 | Shinomiya | 248/311.2 |
| 6,105,917 A | * | 8/2000 | Yabuya et al. | 248/311.2 |
| 6,230,948 B1 | * | 5/2001 | Steiger et al. | 224/539 |
| 6,669,031 B1 | * | 12/2003 | Badonic | 211/66 |

FOREIGN PATENT DOCUMENTS

JP   10-324188   12/1998

* cited by examiner

Primary Examiner—Korie Chan
(74) Attorney, Agent, or Firm—Posz & Bethards, PLC

(57) ABSTRACT

A cup holder has a frame portion, a receiving portion and a housing portion. The frame portion has two insertion holes. The frame portion has a holding member for abutting on the external surface of a beverage container that is inserted in the insertion hole, thereby holding the container. The holding member is constituted by a central holding member and an outer holding member, and the holding members are supported to be individually rotatable and to be protruded inwardly from the periphery of the insertion hole, respectively. The arrangement is such that the degree of protrusion of the central holding member from the periphery of the insertion hole and the degree of protrusion of the outer holding member from the periphery of the insertion hole are different from each other.

21 Claims, 9 Drawing Sheets

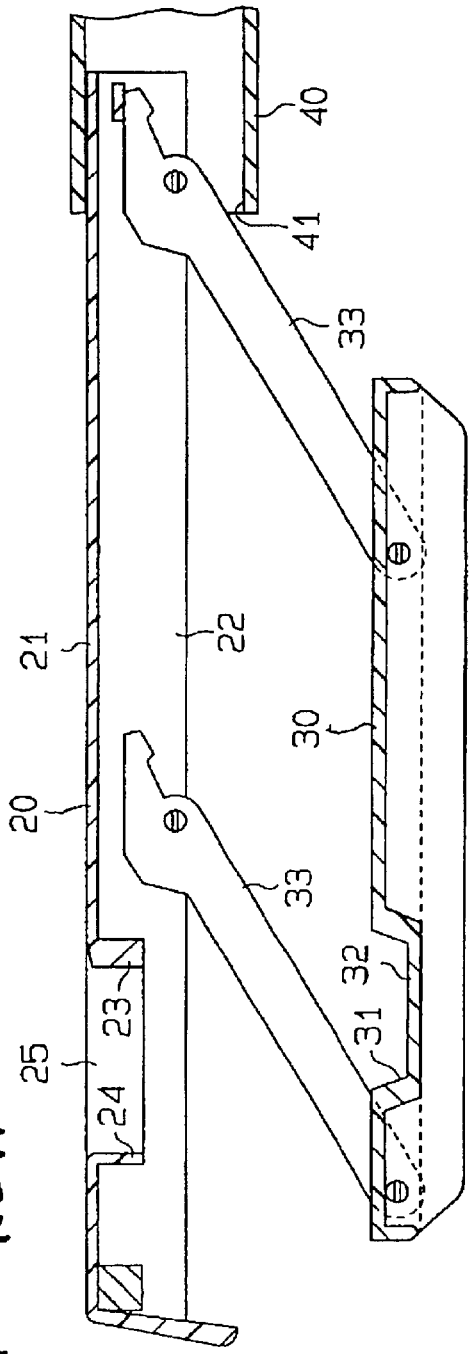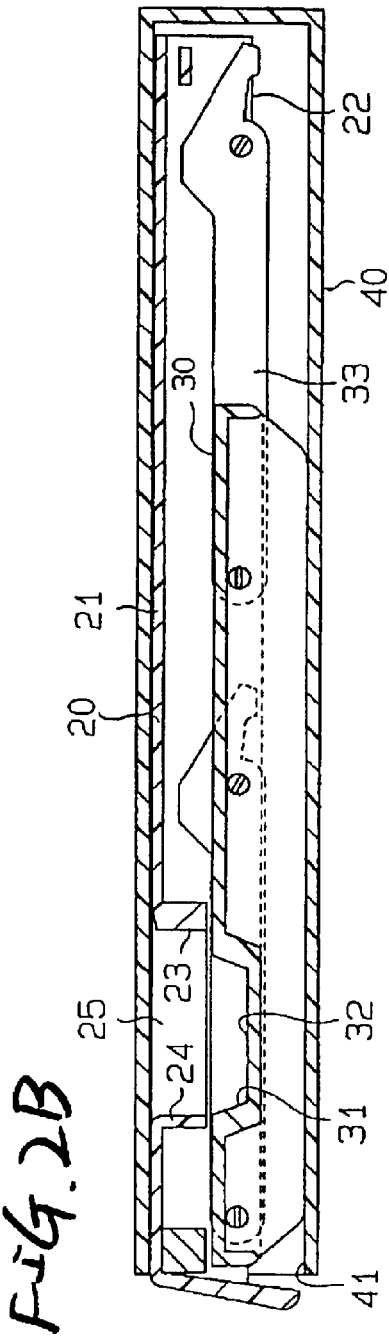

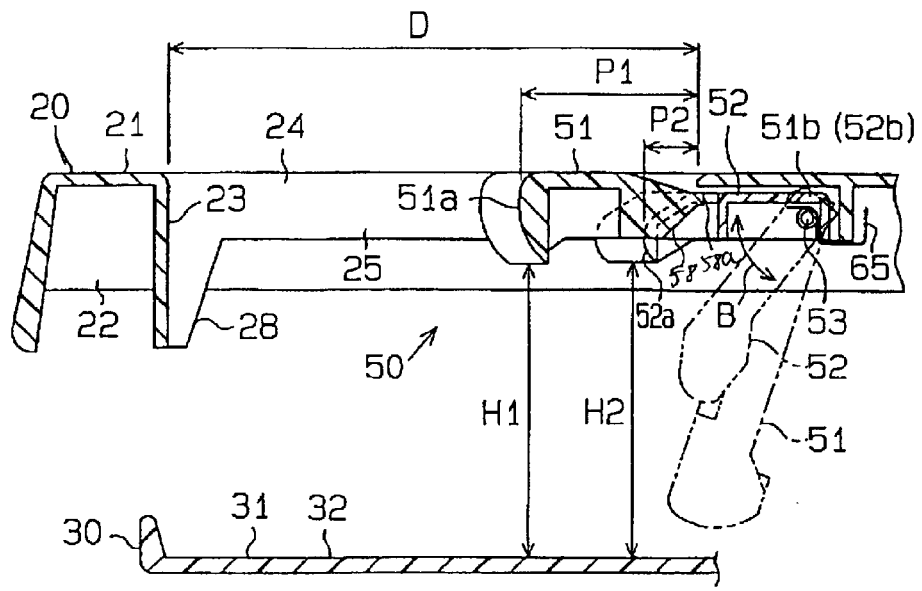

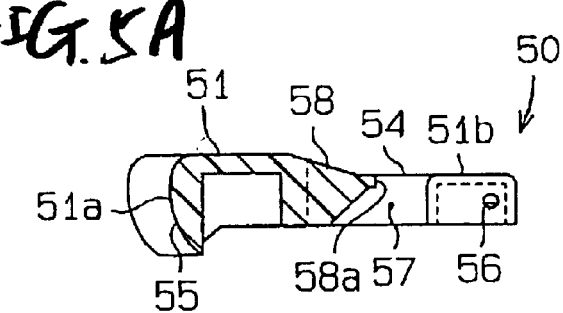
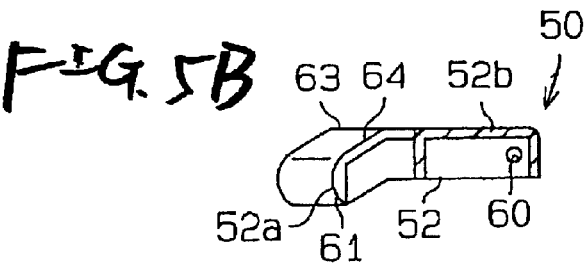
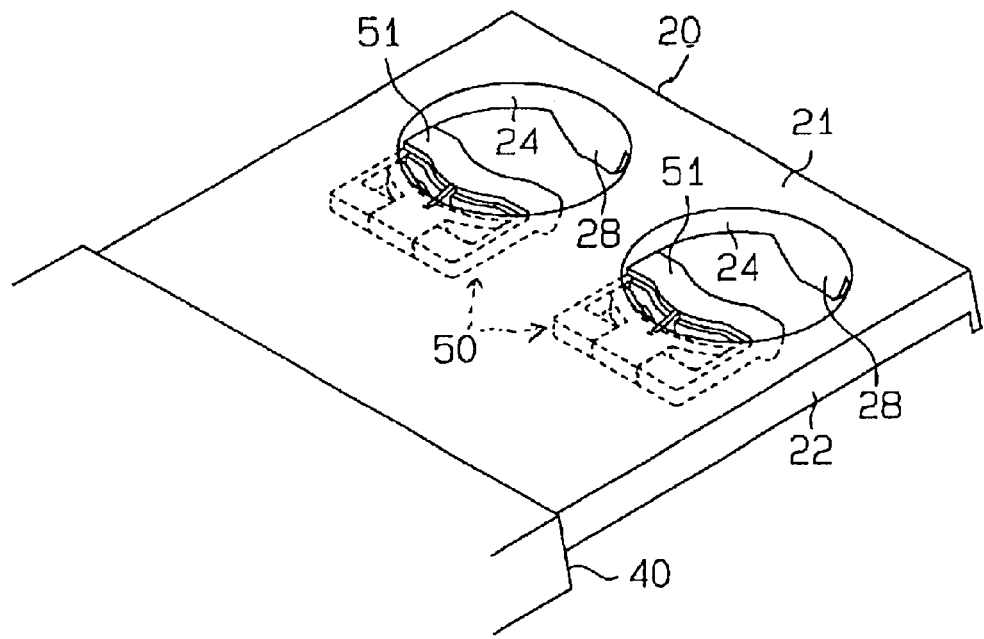

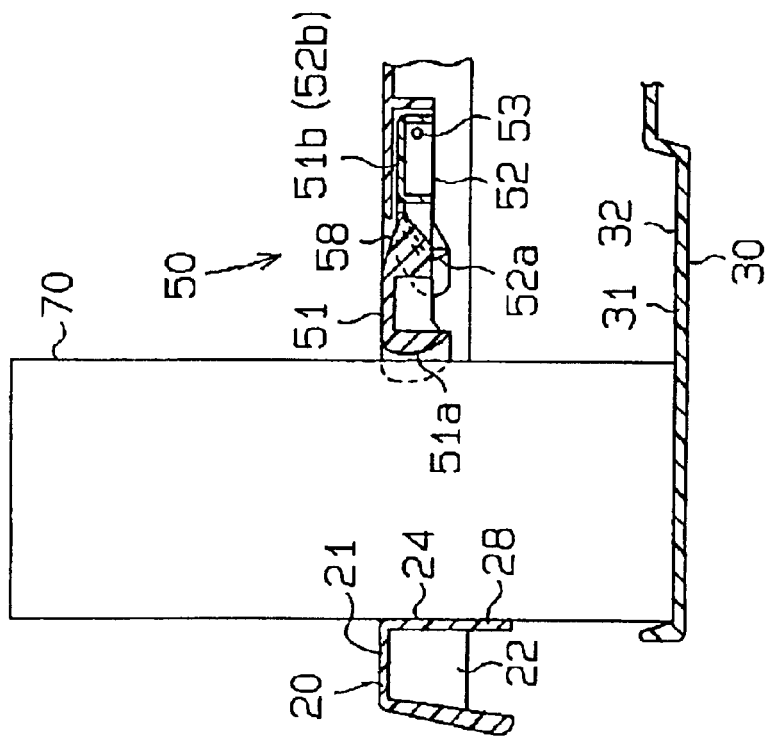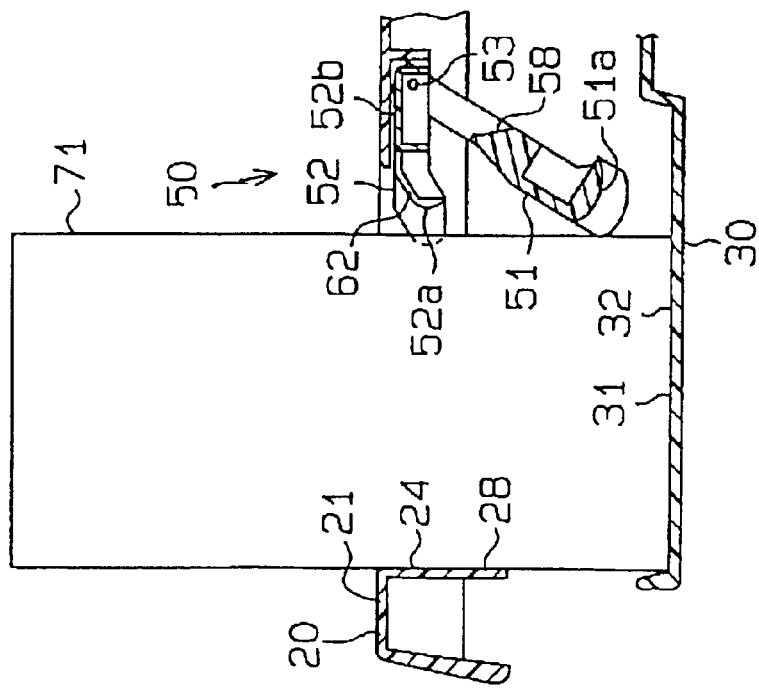

CUP HOLDER

BACKGROUND OF THE INVENTION

1. Field of the Invention

The present invention relates to a cup holder for holding things to be accommodated, for example, various vessels for beverages having different outside diameters.

2. Description of the Related Art

Conventionally, a cup holder to be the cup holder of this kind has been disclosed in Unexamined Japanese Patent Publication No. Hei. 10-324188, for example.

As shown in FIG. 14, the cup holder described in the publication comprises a frame portion 101 provided with an almost circular holding hole 100, a receiving portion 102 having a dogleg shaped side surface and supported to be relatively rotatable with respect to the frame portion 101, and a housing portion 103 for accommodating the frame portion 101 and the receiving portion 102.

The back face of the frame portion 101 is provided with an almost square concave portion 105 having one side portion opened to the holding hole 100 and an upper bottom 104 forming a part of the edge portion of the holding hole 100. Moreover, a holding member 106 formed of a wire to have an almost U-shaped plane is accommodated in the concave portion 105 such that a bottom portion 107 is protruded by a predetermined amount toward the center of the holding hole 100. In the holding member 106, both tip portions 108 bent outward are engaged with an engagement hole 110 of an inside surface 109 provided continuously with the inner peripheral surface of the holding hole 100 in the concave portion 105. The holding member 106 is supported to be rotatable around the engagement hole 110 by the engagement of the tip portion 108 with the engagement hole 110 of the inside surface 109. Moreover, both inside surfaces 109 of the concave portion 105 are provided with a guide projection 111 for guiding the holding member 106 into a reference position (a position parallel with an upper surface 101a of the frame portion 101) when the bottom portion 107 side of the holding member 106 is displaced vertically.

According to the related-art vessel holder, in the case in which a vessel like a cup for a beverage having an outside diameter equal to or less than a distance between the opposed surfaces of the external surface of the bottom portion 107 of the holding member 106 and the inner peripheral surface of the holding hole 100 is to be inserted in the holding hole 100, the vessel is held by a part of the inner peripheral surface of the holding hole 100 and the holding member 106 provided in the reference position. On the other hand, in the case in which the vessel having an outside diameter greater than the distance and equal to or less than the inside diameter of the holding hole 100 is to be inserted in the holding hole 100, the vessel is held by a part of the inner peripheral surface of the holding hole 100 and the holding member 106 having the bottom portion 107 rotated toward the receiving portion 102 side. Moreover, in the case in which the vessel having an outside diameter almost equal to the inside diameter of the holding hole 100 is to be inserted in the holding hole 100, the vessel is held by the inner peripheral surface of the holding hole 100.

In the related-art vessel holder, however, when the outside diameter of the vessel to be inserted in the holding hole 100 is increased, the holding member 106 holds the vessel with the bottom portion 107 displaced downward. On the other hand, generally, when the outside diameter of the vessel for a beverage is increased, a height thereof becomes greater and a center of gravity also tends to be set in a high position. In the related-art vessel holder, therefore, except for the case in which a vessel for a beverage having a greater outside diameter is to be held and the case in which the vessel is to be held by the whole inner peripheral surface of the holding hole 100, the vessel cannot be held in a stable state and might be apt to fall down by the vibration of a vehicle or an inertia during the rotation of the vehicle. This problem becomes more remarkable when the amount of protrusion of the holding member 106 into the holding hole 100 such that a vessel having a small outside diameter to a vessel having a great outside diameter can be held by the common holding hole 100.

SUMMARY OF THE INVENTION

The invention has been made in consideration of such a problem of the related-art and has an object to provide a cup holder capable of more reliably holding a thing to be accommodated in a stable state irrespective of the outside diameter or width of the thing to be accommodated.

In order to attain the object, a first aspect of the invention is directed to a cup holder comprising a frame portion having one or more insertion holes for inserting various things to be accommodated which have different outside diameters or widths, a receiving portion for receiving the things inserted in the insertion hole, and a holding member energized to be set in a predetermined reference position by an energizing member and serving to abut on external surfaces of the things inserted in the insertion hole, thereby holding the things, the holding member having a tip portion thereof protruded from an inner peripheral surface of the insertion hole toward an inside and a base end thereof supported pivotally to be rotatable around a rotating shaft in a direction of the insertion of the things with respect to the frame portion, wherein a plurality of holding members are provided for one insertion hole and are provided such that amounts of the protrusion from an inner peripheral surface of the insertion hole are different from each other.

According to the first aspect of the invention, various things to be accommodated which have different outside diameters or widths to be inserted can be held in a predetermined reference position or a position having a small amount of rotation of the holding members by means of the holding members. For this reason, it is possible to more reliably hold the thing to be accommodated in a stable state irrespective of the outside diameter or width of the thing to be accommodated.

Moreover, a second aspect of the invention is directed to the cup holder according to the first aspect of the invention, wherein at least two holding members are provided in a reference position set in an almost parallel state with at least the receiving portion and a bending position set in an almost rectangular state to the receiving position, and the holding member having a greater amount of protrusion from the inner peripheral surface of the insertion hole is started to be rotated sequentially.

According to the second aspect of the invention, in addition to the functions of the first aspect of the invention, in the case in which the thing to be accommodated is to be inserted in the insertion hole, each holding member is rotated in order when the outside diameter or the width is increased. Accordingly, it is also possible to smoothly accommodate the thing to be accommodated which has a great outside diameter or width and to realize a suitable holding state corresponding to the outside diameter or width of the thing to be accommodated.

Furthermore, a third aspect of the invention is directed to the cup holder according to the first or second aspect of the invention, wherein the holding member is provided such that a distance between a tip portion in the reference position and a mounting surface of the thing to be accommodated in the receiving portion is almost constant.

According to the third aspect of the invention, in addition to the functions of the first or second aspect of the invention, the thickness of the frame portion in the direction of the insertion of the thing to be accommodated can be reduced so that the size of the whole cup holder can be decreased.

Moreover, a fourth aspect of the invention is directed to the cup holder according to the first or second aspect of the invention, wherein the holding member having a smaller amount of protrusion of the tip portion in the reference position from the inner peripheral surface of the insertion hole is provided such that a distance between the tip portion and a mounting surface of the thing to be accommodated in the receiving portion is increased.

According to the fourth aspect of the invention, in addition to the functions of the first or second aspect of the invention, when the outside diameter or width of the thing to be accommodated which is to be inserted into the insertion hole of the frame portion is increased, the thing to be accommodated is held by the holding member placed in a position which is set more apart from the receiving portion. Consequently, the movement of a thing to be accommodated which is provided in a higher position of a center of gravity can be controlled in a higher position with an increase in the outside diameter or width. Consequently, the thing to be accommodated can be held in a stabler state.

Furthermore, a fifth aspect of the invention is directed to the cup holder according to any of the first to fourth aspects of the invention, wherein the holding member is provided in such a state that one rotating shaft is shared.

According to the fifth aspect of the invention, in addition to the functions of any of the first to fourth aspects of the invention, an assembling work can easily be carried out during the assembly of the holding members into the frame portion. In addition, it is possible to reduce the manufacturing cost of the cup holder.

Moreover, a sixth aspect of the invention is directed to the cup holder according to any of the first to fifth aspects of the invention, wherein a holding member on a center side which is provided on the center side of the insertion hole has a concave portion or an opening portion between a tip portion thereof and a base end, and a holding member on an outer peripheral side to be provided on the outer peripheral side of the insertion hole is accommodated in the concave portion or the opening portion.

According to the sixth aspect of the invention, in addition to the functions of any of the first to fifth aspects of the invention, each holding member can be arranged efficiently in a limited space so that the size of the cup holder can be reduced.

Furthermore, a seventh aspect of the invention is directed to the cup holder according to the sixth aspect of the invention, wherein an inclined portion having a downward gradient is provided on an upper surface of the holding member on the outer peripheral side from the base end to the tip portion.

According to the seventh aspect of the invention, in addition to the functions of the sixth aspect of the invention, when the thing to be accommodated is to be inserted into the insertion hole, the bottom portion thereof is guided along the inclined portion so that the thing to be accommodated can easily be inserted.

Moreover, an eighth aspect of the invention is directed to the cup holder according to the sixth or seventh aspect of the invention, wherein the holding member on the center side is provided with at least one projection extended across the concave portion or the opening portion, and the holding member on the outer peripheral side is provided with interference avoiding means for avoiding an interference with the projection.

According to the eighth aspect of the invention, in addition to the functions of the sixth or seventh aspect of the invention, when inserting, into the insertion hole, the thing to be accommodated which has a greater outside diameter or width than a distance between the tip portion of the holding member on the center side and an opposed surface thereof, it is possible to prevent the bottom portion of the thing to be accommodated from being easily caught in the boundary portion of the holding member on the center side and the holding member on the outer peripheral side. Consequently, it is possible to enhance the inserting property of the thing to be accommodated.

Furthermore, a ninth aspect of the invention is directed to the cup holder according to any of the first to eighth aspects of the invention, wherein the holding member is provided to be aggregated in the reference position in the direction of the insertion of the thing to be accommodated.

According to the ninth aspect of the invention, in addition to the functions of any of the first to eighth aspects of the invention, each holding member can be arranged in a compact condition in the direction of the insertion of the thing to be accommodated. Thus, it is possible to further reduce the size of the cup holder.

Moreover, a tenth aspect of the invention is directed to the cup holder according to any of the first to ninth aspects of the invention, wherein the frame portion is provided with a protruded wall protruded in the direction of the insertion of the thing to be accommodated in at least a part of a portion opposed to the tip portion of the holding member in a peripheral edge of the insertion hole.

According to the tenth aspect of the invention, in addition to the functions of any of the first to ninth aspects of the invention, the thing to be accommodated is caused to abut on the protruded wall. Consequently, the movement of the thing to be accommodated which is inserted in the insertion hole is controlled so that the looseness of the thing to be accommodated can be suppressed.

Furthermore, an eleventh aspect of the invention is directed to the cup holder according to any of the first to tenth aspects of the invention, wherein there are provided the holding member on the center side which is disposed on the center side of the insertion hole and the holding member on the outer peripheral side which is disposed on the outer peripheral side of the insertion hole, and in the case in which the thing to be accommodated has a dent portion over a whole periphery of central and bottom portions thereof, the holding member on the outer peripheral side in the reference position permits a passage of a lower bulged portion from the dent portion in the thing to be accommodated and the holding member on the center side has a tip portion to abut on a portion provided below a top of the bulged portion in a rotation state.

In the cup holder of this kind, a thing to be accommodated which has a dent portion provided continuously over almost the whole circumference of a lower portion such as a 500 ml pet bottle of "Diet Coca-Cola" or "Coca-Cola" produced by the Coca-Cola Co., Ltd. is inserted in the insertion hole of the frame portion. On the other hand, according to the eleventh aspect of the invention, in addition to the functions of any of the first to tenth aspects of the invention, it is possible to prevent the tip portions of the holding member on the center side and the holding member on the outer peripheral side from entering the dent portion of the thing to be accommodated with the same thing inserted in the insertion hole. Consequently, it is possible to prevent the difficult removal of the thing to be accommodated which is inserted in the insertion hole.

Features and advantages of the invention will be evident from the following detailed description of the preferred embodiments described in conjunction with the attached drawings.

BRIEF DESCRIPTION OF THE DRAWINGS

In the accompanying drawings:

FIG. 2A is a sectional view taken along a line II—II of FIG. 1 in the state of use and FIG. 2B is a sectional view corresponding to the line II—II of FIG. 1 in the state of accommodation;

FIG. 3 is a sectional view taken along a line III—III of FIG. 1;

FIG. 4A is a front view showing a holding member on the center side and FIG. 4B is a front view showing a holding member on the outer peripheral side;

FIG. 5A is a sectional view taken along a line Va—Va of FIG. 4A and FIG. 5B is a sectional view taken along a line Vb—Vb of FIG. 4B;

FIG. 6 is a partial perspective view showing a frame portion;

FIG. 8 is a view illustrating the rotation state of the holding member on the center side and the holding member on the outer peripheral side;

FIG. 9 is a view illustrating the rotation state of the holding member on the center side and the holding member on the outer peripheral side;

DETAILED DESCRIPTION OF THE PREFERRED EMBODIMENTS

With reference to FIGS. 1 to 11, description will be given to an embodiment in which a cup holder according to the invention is applied to a vessel holder for a beverage.

Figure 1:
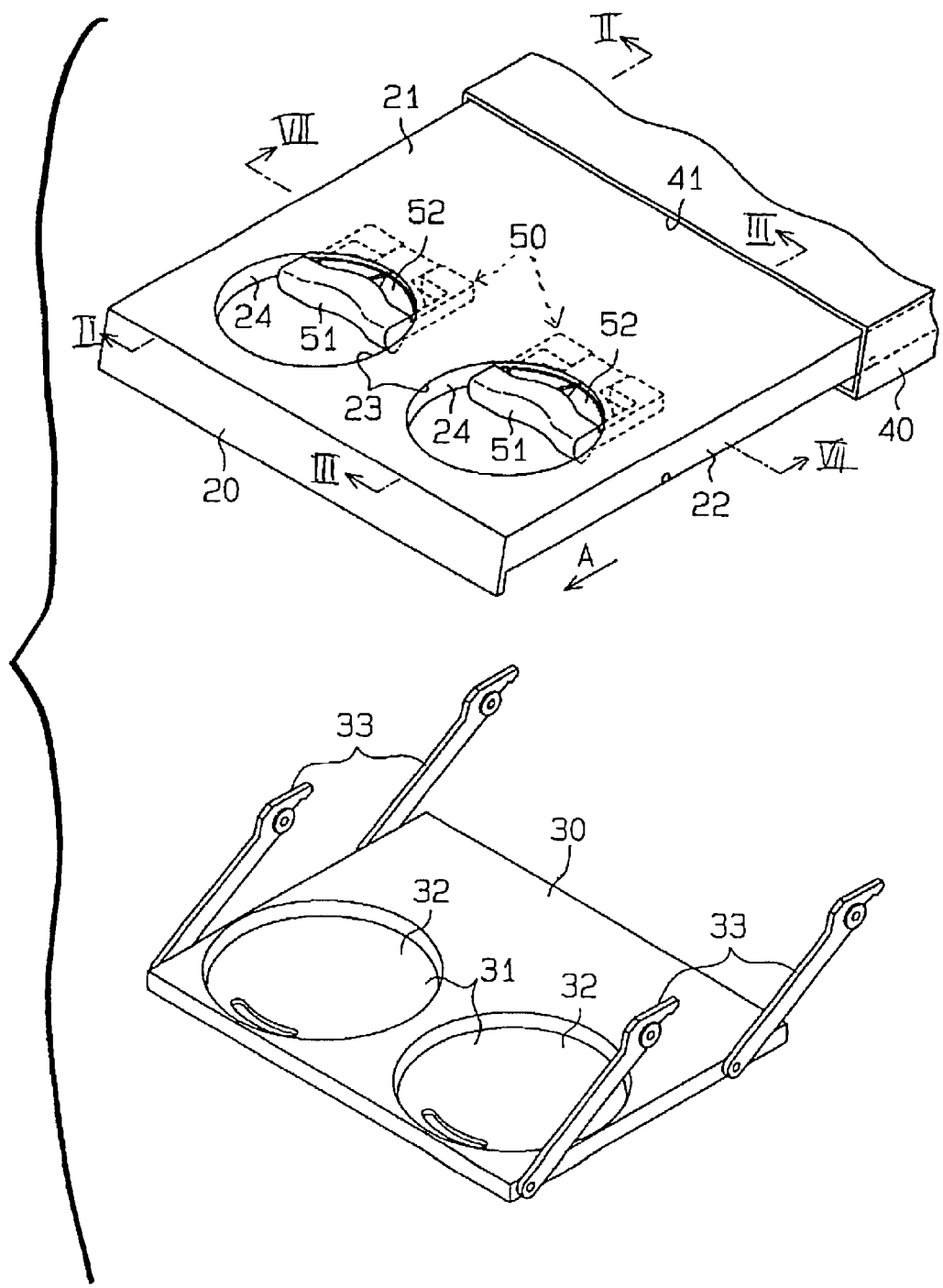
FIG. 1 is an exploded perspective view showing a cup holder for a beverage according to an embodiment.

As shown in FIGS. 1 and 2, a cup holder for a beverage to be a cup holder comprises a frame portion 20, a receiving portion 30 and a housing portion 40 for accommodating the frame portion 20 and the receiving portion 30.

The frame portion 20 has a square-shaped plane portion 21 and a side wall portion 22 protruded downward from the peripheral edge of the plane portion 21. The plane portion 21 is provided with two circular insertion holes 23 having a diameter D (see FIG. 3) of 81.5 mm and a peripheral wall portion 24 protruded downward from the plane portion 21 is formed on a part of the peripheral edges of the insertion holes 23.

The receiving portion 30 is formed to take the shape of a slightly smaller square than the shape of the plane portion 21 of the frame portion 20, and has a concave portion 31 in a position corresponding to each insertion hole 23 of the frame portion 20. The bottom face of the concave portion 31 acts as a mounting surface 32 of a vessel for a beverage inserted into the insertion hole 23 of the frame portion 20. Moreover, the receiving portion 30 is supported to be relatively displaceable with respect to the frame portion 20 through a plurality of (four in this example) arms 33.

The housing portion 40 takes the shape of a box having an opening 41 on a vertical surface thereof. The frame portion 20 and the receiving portion 30 can be accommodated in an aggregation state in the housing portion 40 and the frame portion 20 is supported to be displaceable in a horizontal direction with respect to the housing portion 40. When the frame portion 20 is displaced in the direction of an arrow A (see FIG. 1) in the state of accommodation in the housing portion 40, the plane portion 21 of the frame portion 20 is exposed through the opening 41 of the housing portion 40 as shown in FIG. 2A. At this time, the receiving portion 30 is pulled out together with the frame portion 20 and is displaced to be separated downward from the frame portion 20 by a predetermined distance. Thus, the cup holder for a beverage is brought into the state of use in which the vessel for a beverage can be held.

The vessels for beverages acting as various things to be accommodated which have different outside diameters are inserted into the insertion hole 23. The vessels for beverages thus inserted are mounted on the mounting surface 32 of the concave portion 31 of the receiving portion 30.

To the contrary, when the frame portion 20 set in the state of use is displaced in a reverse direction to the arrow A, the receiving portion 30 approaches the frame portion 20 by the action of the arm 33 and the frame portion 20 when the frame portion 20 is gradually inserted into the housing portion 40, and the frame portion 20 and the receiving portion 30 are aggregated in a short time as shown in FIG. 2B. The frame portion 20 and the receiving portion 30 are accommodated in the housing portion 40. Thus, the cup holder for a beverage can be accommodated in the housing portion 40 in the state of non-use.

In the embodiment, two holding members 50 for abutting on the external surface of the vessel for a beverage inserted in the insertion hole 23 to hold the vessel are provided for each insertion hole 23 on the lower surface side of the frame portion 20 as shown in FIGS. 1 and 3.

The holding member 50 is constituted by a holding member 51 on the center side and a holding member 52 on the outer peripheral side. The holding members 51 and 52 are provided such that tip portions 51a and 52a are protruded inwardly from the insertion hole 23 of the frame portion 20 and an inner peripheral surface 25 of the peripheral wall portion 24. The holding members 51 and 52 are pivotally supported such that base ends 51b and 52b are rotatable in the direction of the insertion of the vessel for a beverage (a direction shown in an arrow B of FIG. 3) around one rotating shaft 53 every insertion hole 23.

The holding member 51 on the center side has a large amount P1 of protrusion from the insertion hole 23 of the frame portion 20 and the inner peripheral surface 25 of the peripheral wall portion 24 to a tip portion 51a and is provided on the center side of the insertion hole 23. On the other hand, the holding member 52 on the outer peripheral side has a smaller amount P2 of protrusion from the insertion hole 23 of the frame portion 20 and the inner peripheral surface 25 of the peripheral wall portion 24 to a tip portion 52a than the amount P1 of protrusion, and is provided on the outer peripheral side of the insertion hole 23. The amount P of protrusion of each of the holding members 51 and 52 is a value obtained by averaging the amount of protrusion from the inner peripheral surface 25 of the insertion hole 23 in both ends and a central portion in each of the holding members 51 and 52 in the direction of extension of the rotating shaft 53.

As shown in FIG. 4A, the holding member 51 on the center side takes an almost inverted U-shape seen on a plane, and the tip portion 51a and the base end 51b are connected to each other through a rod-shaped arm portion 54.

The base ends 51b of the holding member 51 on the center side are bulged in such a direction that the tips of both arm portions 54 approach each other, and are formed apart from each other by a predetermined distance. A side surface parallel with the arm portion 54 on the base end 51b is provided with an insertion hole 56 in which the rotating shaft 53 is to be inserted. Moreover, the tip portion 51a is curved to describe a part of a circular arc having a smaller diameter than that of the insertion hole 23 of the frame portion 20 in such a manner that a center portion 55 in a direction along a center line m of the rotating shaft 53 approaches the center line m.

As shown in FIGS. 4A and 5A, moreover, the holding member 51 on the center side is provided with an opening portion 57 partitioned by the tip portion 51a, the base end 51b and the arm portion 54 between the tip portion 51a and the base end 51b and penetrating through the holding member 51 on the center side in a vertical direction (a direction orthogonal to a paper in FIG. 4). Furthermore, the holding member 51 on the center side is provided with one projection 58 extended across the opening portion 57 from the center portion 55 of the tip portion 51a toward the rotating shaft 53. A rotating shaft side end 58a of the projection 58 is extended to reach the peripheral edge of the insertion hole 23 in such a state that the holding member 51 on the center side is assembled into the frame portion 20 as shown in FIG. 3.

On the other hand, as shown in FIG. 4B, the holding member 52 on the outer peripheral side takes an almost T-shape seen on a plane. The holding member 52 on the outer peripheral side is formed to have such a shape that the tip portion 52a can be accommodated between the tip portion 51a and the base end 51b in the opening portion 57 of the holding member 51 on the center side. Moreover, the base end 52b of the holding member 52 on the outer peripheral side is formed to have such a size as to be accommodated between both base ends 51b in the opening portion 57 of the holding member 51 on the center side.

Moreover, an insertion hole 60 for inserting the rotating shaft 53 is formed on a side surface which is orthogonal to the rotating shaft 53 in the base end 52b of the holding member 52 on the outer peripheral side. Furthermore, the tip portion 52a of the holding member 52 on the outer peripheral side is curved to describe a circular arc which is almost concentrical with the insertion hole 23 of the frame portion 20 in such a manner that a center portion 61 in a direction along the center line m of the rotating shaft 53 approaches the center line m.

As shown in FIGS. 4B and 5B, moreover, the tip portion 52a of the holding member 52 on the outer peripheral side is provided with one slit portion 62 to be interference avoiding means for avoiding an interference with the projection 58 of the holding member 51 on the center side in such a state that both holding members 51 and 52 are assembled into the frame portion 20. The slit portion 62 is extended across the tip portion 52a from the center portion 61 of the holding member 52 on the outer peripheral side toward the rotating shaft 53.

Moreover, the tip portion 52a of the holding member 52 on the outer peripheral side is provided with an inclined portion 64 having a downward gradient from the base end 52b toward the tip portion 52a in the portion of the upper surface 63 which is protruded from the insertion hole 23 of the frame portion 20.

As shown in FIG. 3, the holding members 51 and 52 can be rotated individually between a reference position in which they are almost parallel with the receiving portion 30 (a position shown in a solid line of FIG. 3) and a bending position in which they are almost perpendicular to the receiving portion 30 (a position shown in a two-dotted chain line of FIG. 3) in such a state that the holding members 51 and 52 are assembled into the frame portion 20.

Moreover, the rotating shaft 53 to be the rotating shaft of each of the holding members 51 and 52 is provided in such a position as to be placed apart from the insertion hole 23 on the lower surface side of the plane portion 21 of the frame portion 20.

Figure 7:
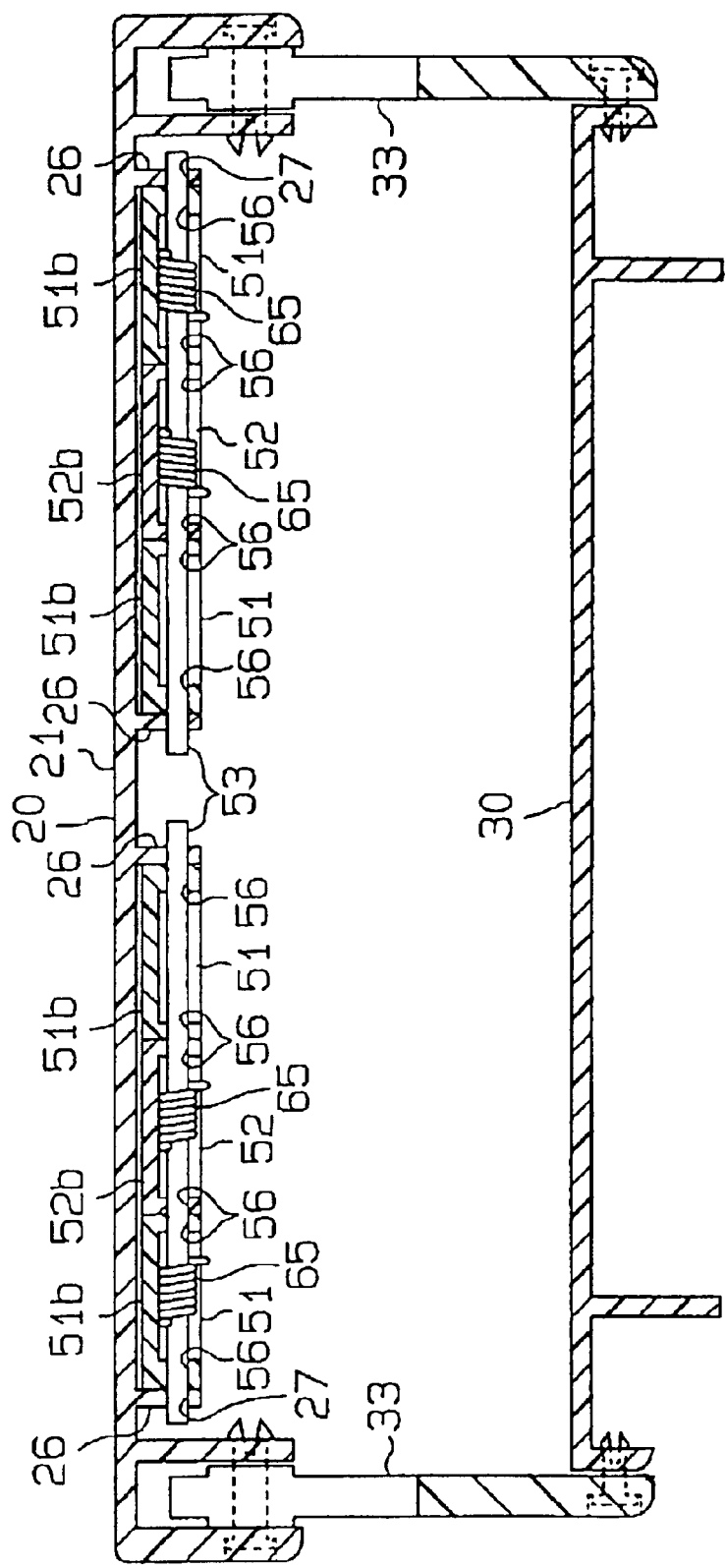
FIG. 7 is a sectional view taken along a line VII—VII of FIG. 1.

As shown in FIG. 7, a rib 26 to be protruded downward from the lower surface is formed in the plane portion 21 of the frame portion 20 corresponding to the vicinity of both ends of the rotating shaft 53. Each rib 26 is provided with an insertion hole 27 and the rotating shaft 53 is supported on the rib 26 with the vicinity of both ends thereof inserted through the insertion hole 27.

In the rotating shaft 53, moreover, a spiral spring 65 to be an energizing member is wound upon each portion corresponding to one of the base end 51b of the holding member 51 on the center side and both ends 52b of the holding member 52 on the outer peripheral side. Each of the holding members 51 and 52 is energized in such a direction as to be rotated from the bending position toward the reference position by means of the corresponding spiral spring 65. The arm portion 54 abuts on the peripheral edge of the insertion hole 23 in the plane portion 21 of the frame portion 20 so that the holding member 51 on the center side is controlled to be rotated beyond the reference position in a direction from the bending position toward the reference position. Moreover, a part of the tip portion 52a abuts on the peripheral edge of the insertion hole 23 in the plane portion 21 of the frame portion 20 so that the holding member 52 on the outer peripheral side is controlled to be rotated beyond the reference position in the direction from the bending position toward the reference position.

As shown in FIG. 3, furthermore, the holding member 52 on the outer peripheral side is attached to the plane portion 21 of the frame portion 20 in such a state as to be accommodated in the opening portion 57 of the holding member 51 on the center side. Consequently, the holding members 51 and 52 are provided to be aggregated in the direction of the insertion of the vessel for a beverage in the reference position (in the direction from the plane portion 21 of the frame portion 20 toward the receiving portion 30 in FIG. 3). Moreover, the arrangement is carried out such that a distance H1 between the tip portion 51a and the mounting surface 32 of the concave portion 31 of the receiving portion 30 in the reference position of the holding member 51 on the center side and a distance H2 between the tip portion 52a and the mounting surface 32 of the receiving portion 30 in the reference position of the holding member 52 on the outer peripheral side are almost constant.

Moreover, the holding member 51 on the center side is set such that the amount P1 of protrusion from the inner peripheral surface 25 of the insertion hole 23 in the tip portion 51a in the reference position ranges from 20 mm to 30 mm. It is desirable that the amount P1 of protrusion should be set to range from 25 mm to 30 mm.

Furthermore, the holding member 52 on the outer peripheral side is set such that the amount P2 of protrusion from the inner peripheral surface 25 of the insertion hole 23 in the tip portion 52a in the reference position ranges from 5 mm to 20 mm. It is desirable that the amount P2 of protrusion should be set to range from 5 mm to 15 mm.

As shown in FIG. 6, furthermore, a part of portions opposed to the tip portions 51a and 52a of the holding members 51 and 52 in the peripheral wall portion 24 of the frame portion 20 is provided with a protruded wall 28 to be further protruded in the direction of the insertion of the vessel for a beverage from another portion of the peripheral wall portion 24 (a direction from an upper part toward a lower part in FIG. 6).

In the cup holder for a beverage having the structure described above, as shown in FIG. 8, when a 250 ml can 70 (a diameter of approximately 52 mm) is inserted as a thing to be accommodated in the insertion hole 23 of the frame portion 20 in the state of use, for example, the holding members 51 and 52 are maintained in the reference position and are not rotated toward the bending position. The can 70 inserted in the insertion hole 23 of the frame portion 20 is brought into such a state as to be held by the inner peripheral surface 25 of the insertion hole 23 and the peripheral wall portion 24 and the tip portion 51a of the holding member 51 on the center side in the reference position.

As shown in FIG. 9, moreover, when a 350 ml can 71 (a diameter of approximately 60 mm) is inserted as a thing to be accommodated in the insertion hole 23 of the frame portion 20, for example, the holding member 51 on the center side is rotated by a predetermined angle from the reference position toward the bending position and the tip portion 51a thereof abuts on the external surface of the can 71. On the other hand, the holding member 52 on the outer peripheral side is maintained in the reference position and is not rotated toward the bending position. The can 71 inserted in the insertion hole 23 of the frame portion 20 is brought into such a state as to be held by the inner peripheral surface 25 of the insertion hole 23 and the peripheral wall portion 24, the tip portion 51a of the holding member 51 on the center side in a rotation state by a predetermined angle, and the tip portion 52a of the holding member 52 on the outer peripheral side to be placed in the reference position.

Figure 10:
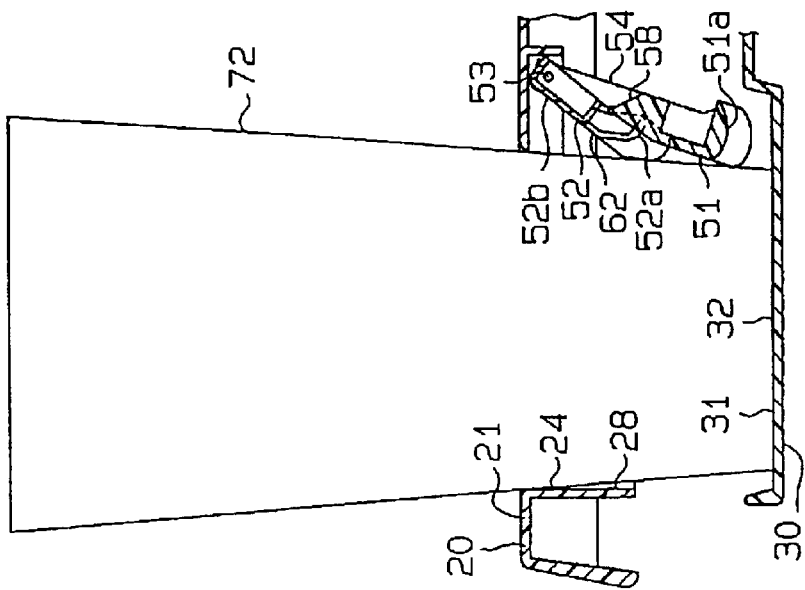
FIG. 10 is a view illustrating the rotation state of the holding member on the center side and the holding member on the outer peripheral side.

As shown in FIG. 10, moreover, when an L size cup 72 (having a diameter of approximately 72 (lower bottom) to 104 (upper bottom) mm) to be used in the McDonald's Corporation in U.S.A. is inserted as the thing to be accommodated in the insertion hole 23 of the frame portion 20, for example, both of the holding members 51 and 52 are rotated by predetermined angles from the reference positions toward the bending positions, respectively. The cup 72 inserted in the insertion hole 23 of the frame portion 20 is held by the peripheral edge of the insertion hole 23 and the tip portions 51a and 52a of the holding members 51 and 52 set in the rotation state by predetermined angles respectively.

Figure 11:
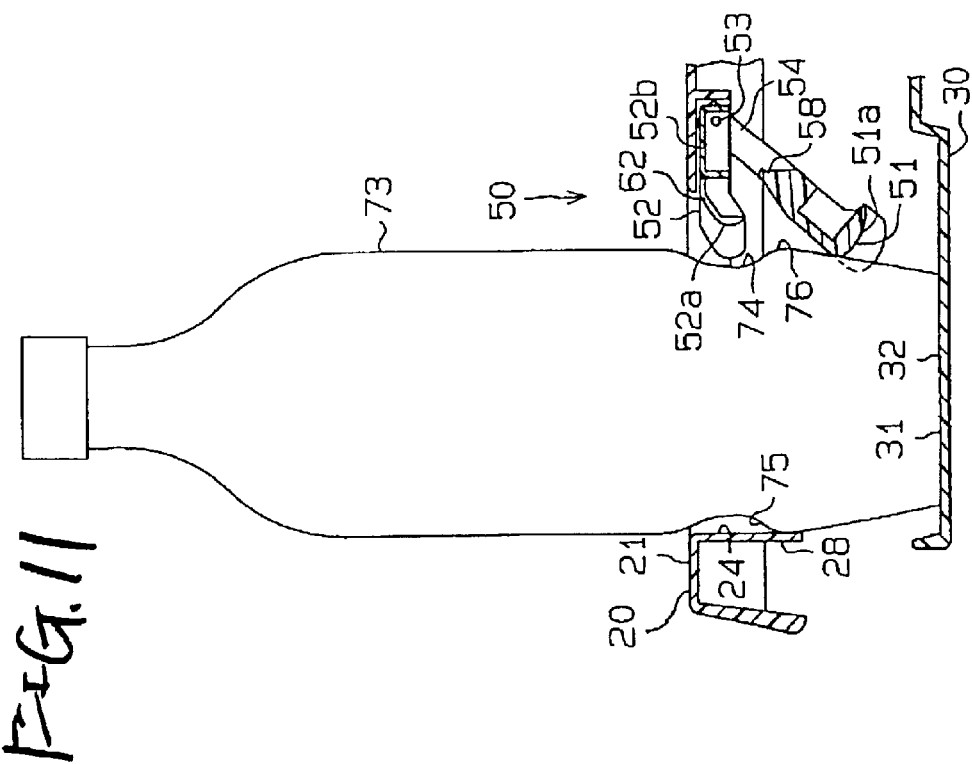
FIG. 11 is a view illustrating the rotation state of the holding member on the center side and the holding member on the outer peripheral side.

As shown in FIG. 11, moreover, when a 500 ml pet bottle 73 to accommodate "Diet Coca-Cola" or "Coca-Cola" produced by the Coca-Cola Co., Ltd. (a dent portion 74 has a diameter of approximately 57 mm and a bulged portion 75 has a diameter of approximately 68 mm) is inserted as the thing to be accommodated in the insertion hole 23 of the frame portion 20, for example, the holding member 52 on the outer peripheral side is maintained in the reference position. Then, the holding member 51 on the center side is rotated by a predetermined angle from the reference position toward the bending position and the tip portion 51a thereof abuts on an external surface provided below a top 76 of the bulged portion 75 of the pet bottle 73. The pet bottle 73 inserted in the insertion hole 23 of the frame portion 20 is held by the inner peripheral surface 25 of the insertion hole 23 and the peripheral wall portion 24, the tip portion 51a of the holding member 51 on the center side in the rotation state by a predetermined angle and the tip portion 52a of the holding member 2 on the outer peripheral side which is placed in the reference position.

According to the embodiment, therefore, the following effects can be obtained.

(1) In the embodiment, the two rotatable holding members 50 having the holding member 51 on the center side and the holding member 52 on the outer peripheral side are provided for each insertion hole 23 of the frame portion 20. Moreover, the amount P1 of protrusion of the holding member 51 on the center side and the amount P2 of protrusion of the holding member 52 on the outer peripheral side for the insertion hole 23 are set to be different from each other. Consequently, various vessels for beverages which are inserted in the insertion hole 23 and have different outside diameters are held in a predetermined reference position or a position having a small amount of rotation of each of the holding members 51 and 52 by the holding member 51 on the center side and the holding member 52 on the outer peripheral side. Consequently, the vessels for beverages can be held more reliably in a stable state irrespective of the outside diameter of the vessel.

(2) In the embodiment, when the vessel for a beverage is inserted in the insertion hole 23 of the frame portion 20, the holding member 51 on the center side having the amount of protrusion with respect to the insertion hole 23 is started to be rotated in order. Consequently, when the vessel for a beverage is to be inserted into the insertion hole 23, the holding members 51 and 52 are rotated in order as the outside diameter of the vessel is increased. Consequently, a vessel for a beverage having a great outside diameter can be smoothly accommodated in the insertion hole 23 and a suitable holding state corresponding to the outside diameter of the vessel for a beverage can be implemented.

(3) In the embodiment, the holding members 51 and 52 are arranged such that the distance H1 between the tip portion 51a in the reference position of the holding member 51 on the center side and the mounting surface 32 of the concave portion 31 in the receiving portion 30 and the distance H2 between the tip portion 52a in the reference position of the holding member 52 on the outer peripheral side and the mounting surface 32 of the receiving portion 30 are almost constant. Consequently, the thickness of the frame portion 20 in the direction of the insertion of the vessel for a beverage can be reduced so that the whole size of the cup holder for a beverage can be decreased.

(4) In the embodiment, the holding member 51 on the center side and the holding member 52 on the outer peripheral side are provided in the frame portion 20 in such a state that one rotating shaft 53 is shared. Consequently, it is possible to easily carry out an assembling work for assembling both of the holding members 51 and 52 into the frame portion 20 and to reduce the manufacturing cost of the cup holder for a beverage.

(5) In the embodiment, the opening portion 57 is provided in the holding member 51 on the center side and both of the holding members 51 and 52 are attached to the frame portion 20 such that the holding member 52 on the outer peripheral side is accommodated in the opening portion 57. Consequently, each of the holding members 51 and 52 can be provided efficiently in a limited space so that the size of the cup holder for a beverage can be reduced.

(6) In the embodiment, the upper surface 63 of the tip portion 52a in the holding member 52 on the outer peripheral side is provided with the inclined portion 64 having a downward gradient from the base end 52b to the tip portion 52a. When the vessel for a beverage is to be inserted into the insertion hole 23 of the frame portion 20, consequently, the bottom portion of the vessel is guided along the inclined portion 64 so that the insertion into the insertion hole 23 can easily be carried out.

(7) In the embodiment, the holding member 51 on the center side is provided with the projection 58 extended across the opening portion 57 and the holding member 52 on the outer peripheral side is provided with the slit portion 62 for avoiding an interference with the projection 58 of the holding member 51 on the center side. When inserting, into the insertion hole 23, the vessel for a beverage having a greater outside diameter than a distance between the tip portion 51a of the holding member 51 on the center side and the inner peripheral surface 25 of the insertion hole 23 of the frame portion 20 to be the opposed surface thereto, consequently, the bottom portion of the vessel can be prevented from being easily caught into the boundary portion of the holding member 51 on the center side and the holding member 52 on the outer peripheral side. As a result, it is possible to enhance the inserting property of the vessel for a beverage.

(8) In the embodiment, the holding member 51 on the center side and the holding member 52 on the outer peripheral side are provided in the frame portion 20 to be aggregated in the direction of the insertion of the vessel for a beverage in the reference positions thereof. Consequently, each of the holding members 51 and 52 can be provided in a compact condition in the direction of the insertion of the vessel for a beverage so that the size of the cup holder for a beverage can further be reduced.

(9) In the embodiment, the protruded wall 28 is provided in a part of the portion of the inner peripheral surface 25 of the insertion hole 23 in the frame portion 20 which is opposed to the tip portion 51a of the holding member 51 on the center side. By causing the external surface of the vessel for a beverage which is inserted into the insertion hole 23 to abut on the protruded wall 28 of the insertion hole 23, consequently, the movement of the vessel in the insertion hole 23 can be controlled so that the looseness of the vessel can be suppressed.

(10) In the embodiment, the amount P1 of protrusion of the holding member 51 on the center side from the inner peripheral surface 25 of the insertion hole 23 of the frame portion 20 is set to range from 20 mm to 30 mm with respect to the insertion hole 23 having the diameter D of 81.5 mm. Moreover, the amount P2 of protrusion of the holding member 52 on the outer peripheral side from the inner peripheral surface 25 of the insertion hole 23 of the frame portion 20 is set to range from 5 mm to 20 mm. In the cup holder for a beverage of this kind, for example, a thing having the dent portion 74 provided continuously over the almost whole circumference in a lower portion such as the 500 ml pet bottle 73 of "Diet Coca-Cola" or "Coca-Cola" produced by the Coca-Cola Co., Ltd. is inserted in the insertion hole 23 of the frame portion 20 in some cases. Depending on the amount of protrusion of each of the holding members 51 and 52 from the inner peripheral surface 25 of the insertion hole 23, a part of the tip portions 51a and 52a of the holding members 51 and 52 enters the dent portion 74 of the pet bottle 73 described above so that the pet bottle 73 inserted in the insertion hole 23 is removed with difficulty inadvertently. On the other hand, when the amount P of protrusion of each of the holding members 51 and 52 is set to the range described above, the tip portions 51a and 52a of the holding members 51 and 52 can be prevented from entering the dent portion 74 of the pet bottle 73 with the pet bottle 73 inserted in the insertion hole 23. Consequently, the inadvertently difficult removal of the pet bottle 73 inserted in the insertion hole 23 can be prevented.

(Variant)

The embodiment according to the invention may be varied as follows.

While the frame portion 20 includes the two insertion holes 23 in the embodiment, the number of the insertion holes 23 to be provided in the frame portion 20 is not restricted to two. One or three or more insertion holes 23 may be provided for the frame portion 20.

Moreover, while the diameter D of the insertion hole 23 is set to 81.5 mm in the embodiment, the value of the diameter D of the insertion hole 23 is not restricted to 81.5 mm but can be set optionally. Furthermore, the shape of the insertion hole 23 is not restricted to a circle but can be optionally set to an ellipse, a polygon or other curved shapes, for example.

In the embodiment, furthermore, the protruded wall 28 of the insertion hole 23 of the frame portion 20 is provided in a part of the portion opposed to the tip portion 51a of the holding member 51 on the center side. However, it is also possible to employ such a structure that the protruded wall 28 is provided over the whole portion opposed to the tip portion 51a of the holding member 51 on the center side. Moreover, the protruded wall 28 may be provided within a wider range such that the rotation of the holding members 51 and 52 is not hindered. Furthermore, it is also possible to employ such a structure that the protruded wall 28 may be omitted.

In the embodiment, moreover, the manner of arrangement of the insertion hole 23 for the plane portion 21 of the frame portion 20 and the holding members 51 and 52 can be set optionally.

In the embodiment, furthermore, it is possible to employ such a structure that the tip portions 51a and 52a of the holding members 51 and 52 are formed like a comb, for example, and comb teeth in the comb-shaped portion of the holding member 52 on the outer peripheral side are provided between the comb teeth of the comb-shaped portion of the holding member 51 on the center side.

In the embodiment, moreover, the amount P1 of protrusion of the holding member 51 on the center side from the inner peripheral surface 25 of the insertion hole 23 is set to a range of 20 mm to 30 mm, and furthermore, the amount P2 of protrusion of the holding member 52 on the outer peripheral side from the inner peripheral surface 25 of the insertion hole 23 is set to a range of 5 mm to 20 mm. However, the values of the amounts P of protrusion of the holding members 51 and 52 are not restricted to the ranges described above. The values of the amounts P of protrusion of the holding members 51 and 52 can be properly changed depending on the shape of the vessel for a beverage which is to be inserted into the insertion hole 23 of the frame portion 20. In short, the values are preferably set such that the holding member 52 on the outer peripheral side in the reference position permits the passage of the bulged portion provided below the dent portion of the vessel and the tip portion 51a of the holding member 51 on the center side abuts on a portion provided below the top of the bulged portion in the rotation state in the case in which the vessel for a beverage has the dent portion over the whole periphery between the center portion and the bottom portion.

In the embodiment, moreover, two holding members 50 are provided for each insertion hole 23 of the frame portion 20. However, the number of the holding members 50 to be provided in the insertion hole 23 is not restricted to two but may be three or more.

Furthermore, while the smooth inclined portion 64 is provided on the upper surface 63 of the tip portion 52a in the holding member 52 on the outer peripheral side in the embodiment, it is also possible to employ such a structure that the step-like inclined portion 64 having a downward gradient is provided from the base end 52b toward the tip portion 52a in the holding member 52 on the outer peripheral side. Moreover, it is also possible to employ such a structure that the inclined portion 64 is omitted.

Moreover, while one projection 58 extended across the opening portion 57 is provided in the holding member 51 on the center side in the embodiment, it is also possible to employ such a structure that two or more projections 58 are provided for the holding member 51 on the center side.

Furthermore, the projection 58 is provided in the holding member 51 on the center side and the holding member 52 on the outer peripheral side is provided with the slit portion 62 for avoiding an interference with the projection 58 of the holding member 51 on the center side in the embodiment. However, in the case in which the holding member 51 on the center side does not have the opening portion 57, for example, it is also possible to employ such a structure that the projection 58 of the holding member 51 on the center side and the slit portion 62 of the holding member 52 on the outer peripheral side are omitted.

Moreover, the interference avoiding means to be provided in the holding member 52 on the outer peripheral side is not restricted to the slit portion 62. It is also possible to employ such a structure that a nick portion obtained by greatly cutting away a portion in the holding member 52 on the outer peripheral side corresponding to the projection 58 of the holding member 51 on the center side and the vicinity thereof is formed in place of the slit portion 62, for example.

Figure 12:
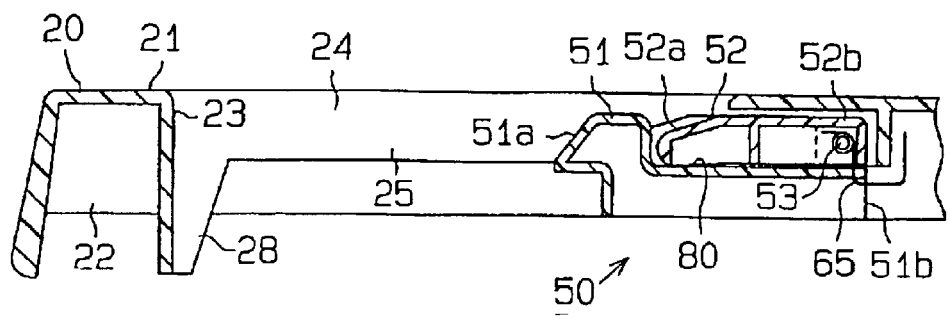
FIG. 12 is a sectional view showing a variant of the structures of arrangement of the holding members on the center side and the outer peripheral side.

In the embodiment, moreover, the holding member 51 on the center side has the opening portion 57 between the tip portion 51a and the base end 51b. However, it is possible to employ such a structure that a concave portion 80 is formed between the tip portion 51a and the base end 51b in the holding member 51 on the center side and the holding members 51 and 52 are attached to the frame portion 20 so as to accommodate the holding member 52 on the outer peripheral side in the concave portion 80 as shown in FIG. 12, for example.

Figure 13:
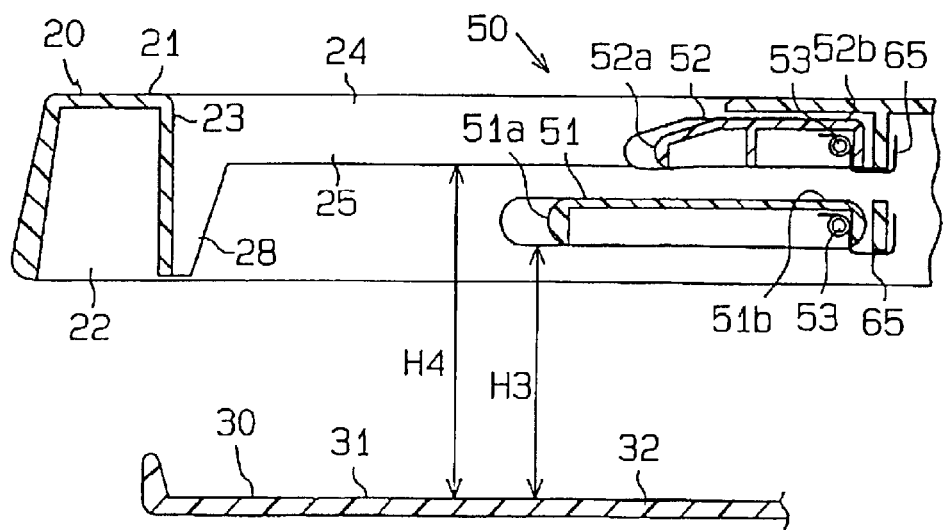
FIG. 13 is a sectional view showing a variant of the structures of arrangement of the holding members on the center side and the outer peripheral side.
Figure 14:
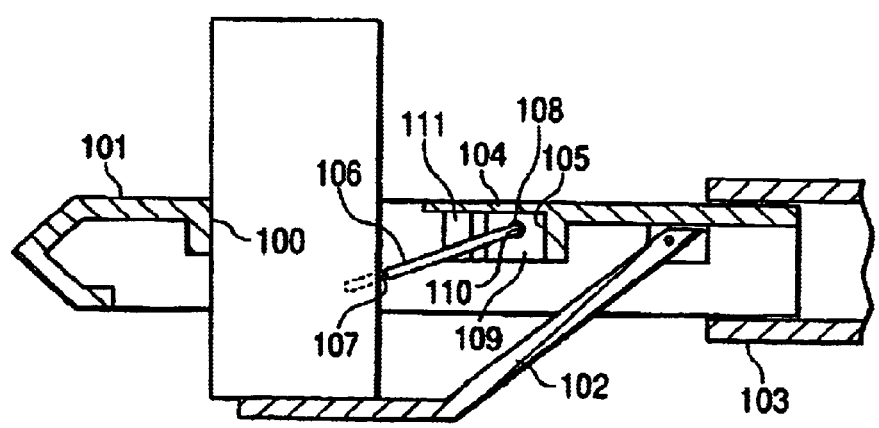
FIG. 14 is a sectional view showing the sectional structure of a cup holder according to the related art.

In the embodiment, furthermore, the holding members 51 and 52 are arranged with one rotating shaft 53 shared. However, it is also possible to employ such a structure that the holding member 51 on the center side and the holding member 52 on the outer peripheral side are pivotally supported by the separate rotating shaft 53 as shown in FIG. 13, for example.

In this case, moreover, the holding members 51 and 52 may be provided in such a manner that a distance H3 between the tip portion 51a of the holding member 51 on the center side and the mounting surface 32 of the receiving portion 30 and a distance H4 between the tip portion 52a of the holding member 52 on the outer peripheral side and the mounting surface 32 of the receiving portion 30 are not constant.

Moreover, it is also possible to employ a structure in which the holding member 50 having a smaller amount of protrusion of the tip portion in the reference position from the inner peripheral surface 25 of the insertion hole 23 (the holding member 52 on the outer peripheral side in FIG. 13) may be provided such that a distance between the tip portion thereof and the mounting surface 32 of the receiving portion 30 is more increased. In such a case, if the outside diameter of the vessel for a beverage which is to be inserted into the insertion hole 23 of the frame portion 20 is increased, the vessel for a beverage is held by the holding member 50 provided apart from the receiving portion 30. With an increase in the outside diameter, consequently, the vessel for a beverage which has a center of gravity provided in a high position can be controlled to be moved in the insertion hole 23 in a higher position and can be held in a stabler state.

While the example of the cup holder for a beverage having the receiving portion 30 has been described in the embodiment, moreover, the invention can also be applied to a cup holder for a beverage which has no receiving portion 30. In such a case, the surface of a design member provided under the frame portion 20 is used in place of the mounting surface 32 of the receiving portion 30, for example.

In the embodiment, furthermore, the description has been given to the example of the cup holder for a beverage in which the frame portion 20 is displaced with respect to the housing portion 40 so that the state of use and that of accommodation can be switched. However, the invention can also be applied to the cup holder for a beverage including only the frame portion 20 fixed to be undisplaceable with respect to the design member, for example.

In the embodiment, moreover, the example of the cup holder for a beverage has been described. However, the invention can also be applied to a case other than a cup holder for a beverage, for example, a mobile telephone holder, a floppy disk, an optical disk, a photomagnetic disk or a case for a cassette tape.

As described above in detail, according to the first aspect of the invention, a thing to be accommodated can be held more reliably in a stable state irrespective of the outside diameter or width of the thing to be accommodated.

According to the second aspect of the invention, in addition to the effects of the first aspect of the invention, a thing to be accommodated which has a great outside diameter or width can also be accommodated smoothly in the insertion hole, and furthermore, a suitable holding state for the outside diameter or width of the thing to be accommodated can be implemented.

According to the third or sixth aspect of the invention, in addition to the effects of the first or second aspect of the invention, the size of the whole cup holder can be reduced.

According to the fourth aspect of the invention, in addition to the effects of the first or second aspect of the invention, the thing to be accommodated can be held in a stabler state.

According to the fifth aspect of the invention, in addition to the effects of any of the first to fourth aspects of the invention, an assembling work for assembling the holding members into the frame portion can easily be carried out and the manufacturing cost of the cup holder can be reduced.

According to the seventh or eighth aspect of the invention, in addition to the effects of the sixth aspect of the invention, it is possible to enhance the inserting property of the thing to be accommodated in the insertion hole of the frame portion.

According to the ninth aspect of the invention, in addition to the effects of any of the first to eighth aspects of the invention, the size of the cup holder can further be reduced.

According to the tenth aspect of the invention, in addition to the effects of any of the first to ninth aspects of the invention, it is possible to suppress the looseness of the thing inserted in the insertion hole of the frame portion within the insertion hole.

According to the eleventh aspect of the invention, in addition to the effects of any of the first to tenth aspects of the invention, it is possible to prevent the inadvertently difficult removal of the thing inserted in the insertion hole of the frame portion.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A cup holder comprising:
   a frame portion having at least one insertion hole for receiving various objects, which have different outside diameters or widths, wherein each object includes a bottom and a sidewall;
   a receiving portion for receiving the bottom of each of the objects inserted in the insertion hole; and
   a plurality of holding members associated with the insertion hole, wherein each holding member is urged into a predetermined reference position by a biasing member, and each holding member serves to abut on the sidewall of each of the objects inserted in the insertion hole, thereby holding each of the objects, and each holding member includes:
   a tip portion, which extends from a peripheral edge of the insertion hole toward the center of the insertion hole; and
   a base end, which is supported pivotally to pivot around a rotating shaft in a direction of insertion of the objects with respect to the frame portion;
   wherein the distance by which a first one of the holding members extends from the peripheral edge of the insertion hole to its tip portion is different from the distance by which a second one of the holding members extends from the peripheral edge of the insertion hole to its tip portion.

2. A cup holder according to claim 1, wherein the first and second holding members are substantially parallel to the receiving portion, when the first and second holding members are in their reference positions, and the first and second holding members have a bent position, in which each of the first and second holding members is almost perpendicular to the receiving portion.

3. A cup holder according to claim 1, wherein when the holding members are in their reference positions, the distances between the tip portions of each holding member and a mounting surface of the receiving portion are substantially the same.

4. A cup holder according to claim 1, wherein the first holding member extends further from the peripheral edge of the insertion hole than the second holding member, and the receiving portion includes a mounting surface for accommodating each of the objects, and the distance between the tip portion of the first holding member and the mounting surface is less than the distance between the tip portion of the second holding member and the mounting surface when the holding members are in their reference positions.

5. A cup holder according to claim 1, wherein the rotating shaft is shared by all of the holding members.

6. A cup holder according to claim 1, wherein the first holding member has an opening in which the second holding member is accommodated.

7. A cup holder according to claim 6, wherein an upper surface of the second holding member in inclined between the base end and the tip portion.

8. A cup holder according to claim 6, wherein the first holding member includes a projection that extends into the opening, and the second holding member is provided with interference avoiding means for avoiding interference with the projection.

9. A cup holder according to claim 1, wherein the holding members are aggregated in their reference positions.

10. A cup holder according to claim 1, wherein the frame portion is provided with a protruded wall, which protrudes in the direction of insertion of the objects, and the protruded wall is opposed to a tip portion of the second holding member.

11. A cup holder according to claim 1, wherein the tip portion of the first holding member extends further from the peripheral edge of the insertion hole than the tip portion of the second holding member, and wherein, if one of the objects is an indented object having an indented section in its sidewall, and the indented section defines a lower bulged section of the object, which has a maximum diameter point, then the tip portion of the first holding member abuts on a portion of the sidewall that is located below the maximum diameter point when the indented object is fully inserted into the insertion hole.

12. A cup holder comprising:
   a frame portion having at least one insertion hole for receiving various objects, wherein the objects have various outside dimensions, and each object includes a bottom and a sidewall;
   a receiving portion for receiving the bottom of each of the objects inserted in the insertion hole; and
   first and second holding members, wherein each holding member is biased into a predetermined reference position and serves to abut against the sidewall of each of the objects inserted in the insertion hole for holding each of the objects, wherein each holding member includes:
   a tip portion, which extends toward the center of the insertion hole from a location that is outside of the insertion hole; and
   a base end, which is supported pivotally to pivot with respect to the frame portion in a direction of insertion of the objects, wherein:
   the distance by which the first holding member extends into the insertion hole from the periphery of the insertion hole is greater than that of the second holding member; and
   the first and second holding members both pivot about a common shaft.

13. A cup holder according to claim 12, wherein the holding members are substantially parallel with the receiving portion when the holding members are located in their respective reference positions.

14. A cup holder according to claim 12, wherein the receiving portion includes a mounting surface for accommodating each of the objects, and the distances between the tip portions of the holding members and the mounting surface are substantially the same when the holding members are in their reference positions.

15. A cup holder according to claim 12, wherein the receiving portion includes a mounting surface for accommodating each of the objects, and the distance between the tip portion of the first holding member and the mounting surface is less than the distance between the tip portion of the second holding member and the mounting surface, when the holding members are in their reference positions.

16. A cup holder according to claim 12, wherein the first holding member has an opening located between its tip portion and its base end, and the second holding member is accommodated in the opening.

17. A cup holder according to claim 16, wherein an upper surface of the second holding member includes an inclined section, which is inclined downwardly towards the center of the insertion hole.

18. A cup holder according to claim 16, wherein the first holding member is provided with at least one projection that extends into the opening, and the second holding member is provided with interference avoiding means for avoiding interference with the projection.

19. A cup holder according to claim 12, wherein the first and second holding members are aggregated in their reference positions.

20. A cup holder according to claim 12, wherein the frame portion is provided with a protruded wall, which protrudes in the direction of insertion of the objects, and the protruded wall is opposed to the tip portion of the first holding member at a peripheral edge of the insertion hole.

21. A cup holder according to claim 12, wherein, if one of the objects is an indented object, which has an indented section in its sidewall, and the indented section defines a lower bulged section of the object, which has a maximum diameter point, then the tip portion of the first holding member abuts on a portion of the sidewall that is located below the maximum diameter point when the indented object is fully inserted into the insertion hole.

* * * * *